United States Patent [19]

Steinhofer

[11] 4,427,402

[45] Jan. 24, 1984

[54] INFINITELY VARIABLE CONE DISK-WRAPPING VEE BELT DRIVE FOR DRIVING A MOTORCYCLE

[75] Inventor: Konrad Steinhofer, Graz, Austria

[73] Assignee: Steyr-Daimler-Puch Aktiengesellschaft, Vienna, Austria

[21] Appl. No.: 246,582

[22] Filed: Mar. 23, 1981

[30] Foreign Application Priority Data

Apr. 10, 1980 [AT] Austria ..................... 1935/80

[51] Int. Cl.³ ............................................ F16H 55/52
[52] U.S. Cl. ........................................ 474/13; 474/46;
474/17; 474/42
[58] Field of Search ................ 474/46, 13, 11, 12,
474/17, 15, 14, 42

[56] References Cited

U.S. PATENT DOCUMENTS

| 2,709,372 | 5/1955 | Melone | 474/13 |
| 2,790,525 | 4/1957 | Jaulmes | 474/14 X |
| 3,151,492 | 10/1964 | Ozinga | 474/11 |
| 3,362,242 | 1/1968 | Watkins | 474/46 X |

FOREIGN PATENT DOCUMENTS

| 213258 | 2/1961 | Austria . | |
| 184830 | 5/1907 | Fed. Rep. of Germany . | |
| 1001901 | 1/1957 | Fed. Rep. of Germany . | |
| 960066 | 3/1957 | Fed. Rep. of Germany . | |
| 961420 | 4/1957 | Fed. Rep. of Germany . | |
| 429832 | 7/1911 | France . | |
| 26653 | of 1909 | United Kingdom . | |
| 5679 | of 1911 | United Kingdom . | |
| 754280 | 8/1956 | United Kingdom | 474/14 |
| 860041 | 2/1961 | United Kingdom | 474/17 |

Primary Examiner—Lawrence J. Staab
Assistant Examiner—Michael D. Bednarek
Attorney, Agent, or Firm—Kurt Kelman

[57] ABSTRACT

The infinitely variable cone disk-wrapping vee belt drive comprises a pair of coaxial cone disks defining between them a vee-shaped groove and comprising an axially fixed, first cone disk and a second cone disk, which is axially displaceable relative to said first cone disk. A vee belt is trained around said first and second cone disks in said vee-shaped groove. First spring means urge said second cone disk axially toward said first cone disk. Locking means are provided, which are non-rotatably connected to one of said cone disks and movable to a locking position, in which said locking means hold said second cone disk against an axial displacement. Second spring means are provided, which urge said locking means to said locking position. Said locking means are arranged to unlock said second cone disk in response to a centrifugal force acting on said locking means and overcoming the force of said second spring means.

4 Claims, 2 Drawing Figures

INFINITELY VARIABLE CONE DISK-WRAPPING VEE BELT DRIVE FOR DRIVING A MOTORCYCLE

BACKGROUND AND SUMMARY OF THE INVENTION

This invention relates to drive means for lightweight motorcycles comprising an infinitely variable, cone disk-wrapping vee belt drive, which is used also to start the engine and comprises a pair of cone disks for driving the vee belt as the engine is started. One cone disk of said pair is axially fixed and the other cone disk of said pair is axially displaceable by spring force in a sense to reduce the vee-shaped gap between the cone disks of said pair.

In such cone disk-wrapping vee belt drives, a second pair of cone disks drive the vee belt while the vehicle is traveling and consist of an axially fixed cone disk and a cone disk which is axially displaceable by means of flyweights in a sense to reduce the vee-shaped gap between the cone disks of the second pair. In response to an increase of the speed of the second pair of cone disks, the flyweights move radially outwardly and the axially displaceable cone disk is shifted to reduce the vee-shaped gap so that the vee belt is urged to a larger diameter of the pair of cone disks. As the length of the vee belt cannot be changed, the vee-shaped gap between the cone disks of the second pair will be increased against the force exerted by the spring so that an increase of the speed of the cone disks of the second pair will result in the desired decrease of the total transmission ratio.

If there is no compression release, the starting shock resulting from the starting of the motor by means of the cone disk-wrapping vee belt drive is often so heavy that the vee belt is drawn into the vee-shaped gap between the cone sheaves of the first pair, which are normally driven by the belt but are now driving it. Because the cone disks of the other pair, which are provided with the flyweights do not yet rotate, the vee belt will remain on a small diameter in the vee-shaped gap between the cone disks of that pair and will slacken. The vee belt will then slip and the transmission ratio between the pedal and the crankshaft will be highly reduced. Power will be dissipated by the resulting friction and the transmission of force will be interrupted.

In order to avoid this disadvantage which arises during a start effected by an infinitely variable cone disk-wrapping vee belt drive, it is known that the cone disk-wrapping vee belt drive can be by-passed by means of gears and a suitable clutch during the starting operation (Austrian Pat. No. 213,258). But that concept necessitates a comparatively expensive design comprising additional gears and coupling elements.

It is an object of the invention to eliminate these disadvantages and to provide a drive which is of the kind described first hereinbefore and which is relatively simple in structure and comprises relatively simple structural elements and yet reliably prevents a slackening of the vee belt during a starting operation performed by the cone disk-wrapping vee belt drive.

This object is accomplished in accordance with the invention by providing the pair of cone disks driving the vee belt as the engine is started with locking means, which prevent a displacement of the displaceable cone disk during the starting operation and which are urged to the locking position by spring force and adapted to unlock the displaceable cone disk in response to centrifugal force.

Because the locking means temporarily prevents an axial displacement of the cone disk which is otherwise displaceable, the vee-shaped gap between the two cone disks cannot increase so that the vee belt will not be drawn into the vee-shaped gap and will not slacken. As a result, the crankshaft will be rotated at a maximum speed during starting so that the starting response is very good.

In a cone disk-wrapping vee belt drive in which the hub of the axially fixed cone disk of the pair of cone disks which drive the vee belt as the engine is started surrounds the hub of the displaceable cone disk, a particularly suitable design will be obtained if the locking means comprise a locking member radially slidably mounted in the hub of the axially fixed cone disk and constituting a flyweight and, which in locking position, extends into a peripheral recess of the hub of the displaceable cone disk and is biased radially inwardly by a spring. When the drive is in position of rest or the cone disks rotate only at low speed, the locking member will act as a coupling member between the hubs of the two cone disks. As soon as the speed has increased, the locking member will act as a flyweight, which moves radially outwardly to disengage the hub of the displaceable cone disk so that the latter is now freely axially displaceable and will not obstruct the automatic infinite control of the cone disk-wrapping vee belt drive while the vehicle is traveling or the engine is running.

The peripheral recess in the hub subtends a larger central angle than the locking member so that the latter has a certain peripheral backlash in the peripheral recess. This is necessary to allow for tolerances and to ensure an engagement of the locking member even when the hubs of the two cone disks have rotated relative to each other.

In a particularly desirable arrangement, the locking member extends radially through the hub of the axially fixed cone disk and is engaged on the outside by an annular spring, which is spaced around the hub and has ends hooked into an eyelet integral with the hub and diametrically opposite to the locking member. Such an annular spring is subjected to bending and permits a radially outwardly directed movement of the locking member to the disengaged position by relatively small forces. The locking member and the eyelet can easily be designed for a favorable distribution of mass and to avoid rotary unbalance. Owing to the clearance between the annular spring and the periphery of the hub, the annular spring can be deformed to an oval shape under load.

According to a preferred further feature of the invention, two stops for limiting the excursion of the annular spring are provided on opposite sides of the locking member. Those stops will retain the locking member in the hub of the axially fixed cone disk so that the locking member cannot become canted.

Finally, the locking member comprises a peripherally extending groove for receiving the annular spring so that the same requires no additional guidance, which would resist the movement.

BRIEF DESCRIPTION OF THE DRAWINGS

An embodiment of the invention is shown by way of example on the drawing, in which.

DETAILED DESCRIPTION OF THE INVENTION

Figure 1:
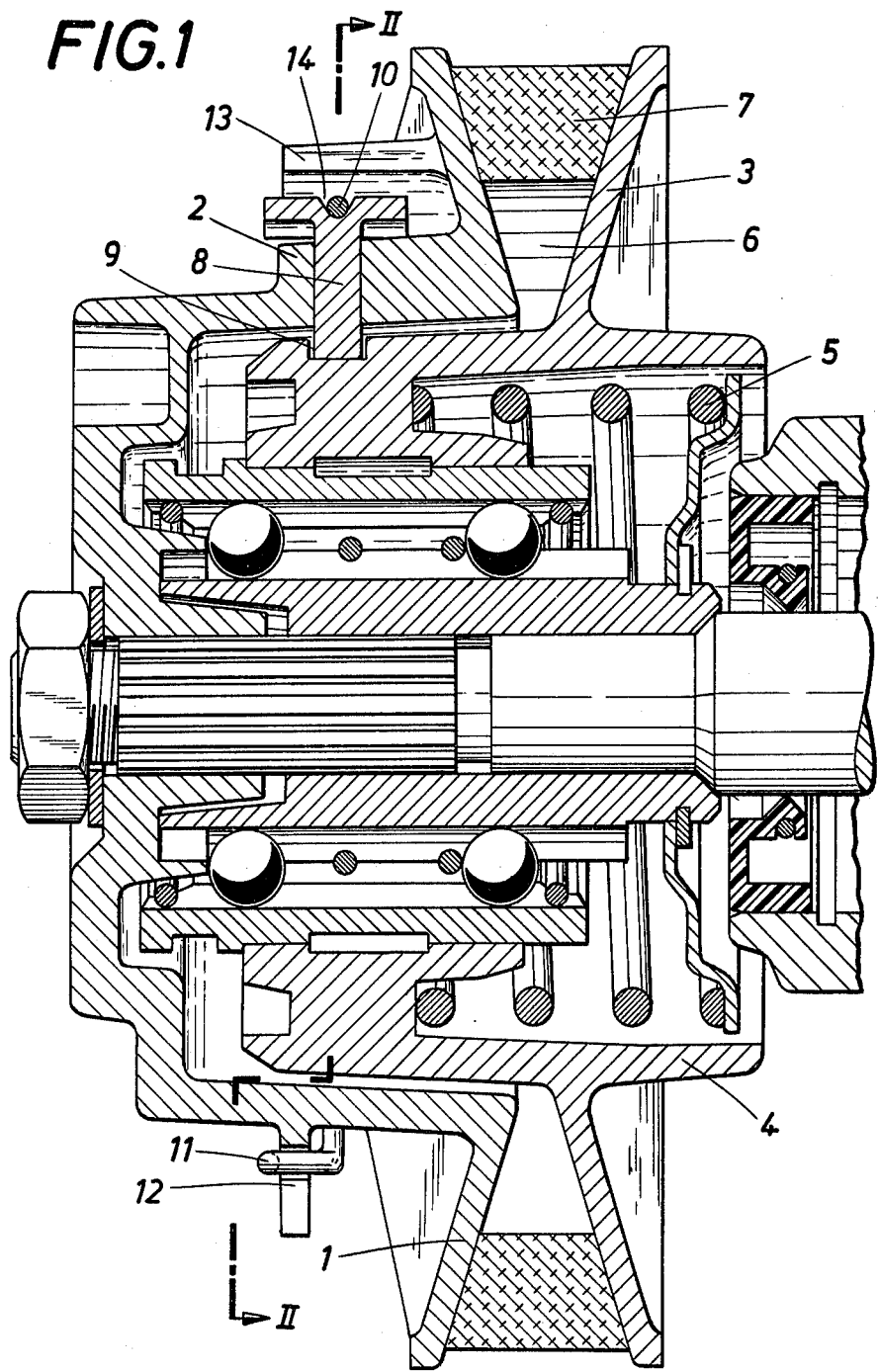
FIG. 1 is an axial sectional view showing that pair of cone disks of a cone disk-wrapping vee belt drive which are driven by the vee belt during normal operation and which drive the vee belt as the engine is started.

An axially fixed cone disk 1 comprises a hub 2. Coaxial cone disk 3 comprises a hub 4 and is displaceable by the force of the spring 5 in a sense to reduce the vee-shaped gap defined by the two cone disks 1, 3. The depth to which the vee belt 7 enters the vee-shaped gap 6 is variable. The hub 2 of the axially fixed cone disk 1 surrounds the hub 4 of the displaceable cone disk 3. A locking member 8 is radially slidably mounted in the hub 2 and in position of rest protrudes into a peripheral recess 9 of the hub 4. The locking member 8 constitutes a flyweight and extending through the hub 2 of the axially fixed cone disk 1 and is engaged on the outside by an annular spring 10, which is spaced around the hub 2. The ends 11 of the spring 10 are hooked into an eyelet 12 integral with the hub 2 and diametrically opposite to the locking member 8. It is apparent from FIG. 2 that the peripheral recess 9 of the hub 4 subtends a larger central angle than the locking member 8.

Two stops 13 for limiting the excursion of the annular spring 10 are provided on opposite sides of the locking member 8. The locking member 8 is formed with a substantially vee-shaped groove 14, which extends in the peripheral direction and receives the annular spring 10.

Figure 2:
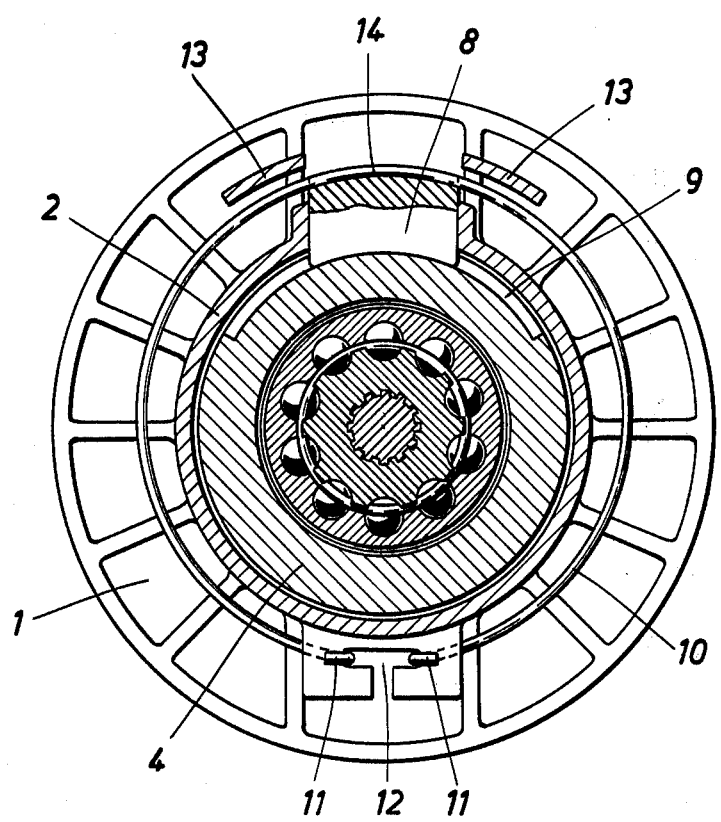
FIG. 2 is a transverse sectional view taken on line II—II of FIG. 1 and drawn to a smaller scale.

The pair of cone disks 1, 3 are connected by the vee belt 7 to a second pair of cone disks, which drive the vee belt 7 while the vehicle is traveling and consist of an axially fixed cone disk and a cone disk which is axially displaceable by means of flyweights in a sense to reduce the vee-shaped gap between the cone disks. The pair of cone disks 1, 3 are driven by the vee belt 7 when the vehicle is traveling but drive the vee belt 7 as the engine is started. FIGS. 1 and 2 show the position of rest, which is still assumed when the starting of the engine begins. It is seen that the locking member 8 biased radially inwardly by the annular spring 10 extends into the recess 9 to prevent an axial displacement of the normally axially displaceable cone disk 3 until the speed has sufficiently increased so that the locking member 8 acting as a flyweight moves radially outwardly against the force of the spring 10 and thus releases the hub 4 and the cone disk 3. Then the vee-shaped gap 6 can be widened.

What is claimed is:

1. An infinitely variable cone disk-wrapping V-belt drive for a motorcycle, comprising
    (a) a pair of coaxial cone disks defining between them a V-shaped groove and comprising an axially fixed, first cone disk including a first hub, a second cone disk axially displaceable relative to said first cone disk and including a second hub surrounded by said first hub, the second hub defining a peripheral recess,
    (b) a V-belt trained around said first and second cone disks in said V-shaped groove,
    (c) first spring means urging said second cone disk axially towards said first cone disk,
    (d) locking means including a locking member non-rotatably connected to, and extending radially through, said first hub, the locking member being radially slidably mounted in said first hub and constituting a flyweight adapted to extend into the peripheral recess to hold said second hub locked against axial displacement, and the first hub being integrally formed with an eyelet diametrically opposite to said locking member,
    (e) second spring means including an annular spring spaced around said first hub and having end portions hooked into said eyelet, the annular spring urging said locking member into the locking position, and
    (f) the locking means being arranged to unlock said second cone disk in response to a centrifugal force acting on said locking means and overcoming the force of said annular spring.

2. The drive set forth in claim 1, wherein said peripheral recess subtends a larger central angle than said locking member.

3. The drive set forth in claim 1, wherein two limit stops are disposed on opposite sides of said locking member and arranged to limit the excursion of said annular spring.

4. The drive set forth in claim 1, wherein said locking member has a peripheral groove which receives said annular spring.

* * * * *